(12) United States Patent
Baek et al.

(10) Patent No.: US 12,200,287 B2
(45) Date of Patent: Jan. 14, 2025

(54) REMOTE CONTROL DEVICE AND METHOD FOR OPERATING SAME

(71) Applicant: LG ELECTRONICS INC., Seoul (KR)

(72) Inventors: Sanghyun Baek, Seoul (KR); Sangjin Ahn, Seoul (KR); Gwanhui Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 62 days.

(21) Appl. No.: 18/014,063

(22) PCT Filed: Jul. 1, 2020

(86) PCT No.: PCT/KR2020/008620
§ 371 (c)(1),
(2) Date: Dec. 30, 2022

(87) PCT Pub. No.: WO2022/004918
PCT Pub. Date: Jan. 6, 2022

(65) Prior Publication Data
US 2023/0269415 A1 Aug. 24, 2023

(51) Int. Cl.
*H04N 21/422* (2011.01)
*G06F 3/0362* (2013.01)

(52) U.S. Cl.
CPC ....... *H04N 21/4221* (2013.01); *G06F 3/0362* (2013.01); *H04N 21/42221* (2013.01)

(58) Field of Classification Search
CPC .......... H04N 21/4221; H04N 21/42221; G06F 3/0362; G06F 2203/0384
See application file for complete search history.

(56) References Cited

U.S. PATENT DOCUMENTS 9,612,733 B2 4/2017 Kim et al.
2018/0098109 A1 4/2018 Seo et al.

FOREIGN PATENT DOCUMENTS

EP 2428875 3/2012
JP 2008061064 3/2008
(Continued)

OTHER PUBLICATIONS

European Patent Office Application Serial No. 20942786.3, Search Report dated Feb. 2, 2024, 4 pages.
(Continued)

*Primary Examiner* — Michael E Teitelbaum
(74) *Attorney, Agent, or Firm* — LEE, HONG, DEGERMAN, KANG & WAIMEY (57) ABSTRACT

An embodiment of the present disclosure provides a remote control device including a user input interface including a wheel button, a memory including a key buffer, a wireless communication interface, and a processor configured to receive a wheel input signal for the wheel button, generate a wheel input control signal corresponding to the wheel input signal, output the generated wheel input control signal through the wireless communication interface, store a wheel repeat control signal in the key buffer when the wheel input signal is continuously input, and output the wheel repeat control signal stored in the key buffer through the wireless communication interface at each predetermined period.

9 Claims, 9 Drawing Sheets

(56) References Cited

FOREIGN PATENT DOCUMENTS

| KR | 20050082233 A | * | 8/2005 |
| KR | 1020050082233 | | 8/2005 |
| KR | 1020130129727 | | 11/2013 |
| KR | 20140125629 A | * | 10/2014 |
| KR | 1020140125629 | | 10/2014 |
| KR | 1020160004630 | | 1/2016 |

OTHER PUBLICATIONS

PCT International Application No. PCT/KR2020/008620, International Search Report dated Mar. 29, 2021, 4 pages.

* cited by examiner

| | | | | | | | |
|---|---|---|---|---|---|---|---|
| Wheel (Clear) | Empty | Empty | Empty | Empty | Empty | Empty | Empty |
| Wheel (Clear) | Wheel (Clear) | Empty | Empty | Empty | Empty | Empty | Empty |
| Wheel (Clear) | Wheel (Clear) | CH UP | Empty | Empty | Empty | Empty | Empty |
| CH UP | CH UP | CH UP | CH UP | Empty | Empty | Empty | Empty |

REMOTE CONTROL DEVICE AND METHOD FOR OPERATING SAME

CROSS-REFERENCE TO RELATED APPLICATIONS

This application is the National Stage filing under 35 U.S.C. 371 of International Application No. PCT/KR2020/008620, filed on Jul. 1, 2020, the contents of which are all incorporated by reference herein in their entirety.

TECHNICAL FIELD

The present disclosure relates to a remote control device and a method for operating the same, and more particularly, to a remote control device, which processes a wheel button control signal of the remote control device, and a method for operating the same.

BACKGROUND ART

In general, in the case of a TV remote controller that remotely controls a display device, control signals are transmitted to the display device by using an RF module, an IR module, or the like.

As the TV remote controller, hard keys such as a channel up/down key and a power key are generally used. However, due to the recent development of technology, new function buttons such as a fingerprint recognition button and a wheel button have been added to TV remote controllers that are being used at home.

Meanwhile, in a process in which a user controls a TV by using a wheel button, the operation of the wheel button is not matched with the output of control signals, and thus, the user has difficulty in controlling the TV by using the wheel button.

For example, when the user uses the wheel button to change a channel, the channel is switched slowly, compared to other keys, or even when the user stops using the wheel button, the channel is changed.

DISCLOSURE OF INVENTION

Technical Problem

The present disclosure aims to provide a remote control device, which naturally outputs a control signal according to a user's intention in a process of outputting a control signal matched with a wheel button, and a method for operating the same.

The present disclosure aims to provide a remote control device for outputting a control signal of a wheel button similarly to a control signal output of a hard key, and a method for operating the same.

A remote control device according to an embodiment of the present disclosure is intended to solve a problem that a control signal of a wheel button is output even after the use of the wheel button is finished.

Technical Solution

The Remote control device according to the embodiment of the present disclosure may comprise a user input interface comprising a wheel button, a memory comprising a key buffer, a wireless communication interface, and a processor configured to receive a wheel input signal for the wheel button, generate a wheel input control signal corresponding to the wheel input signal, output the generated wheel input control signal through the wireless communication interface, store a wheel repeat control signal in the key buffer when the wheel input signal is continuously input, and output the wheel repeat control signal stored in the key buffer through the wireless communication interface at each predetermined period.

The Remote control device according to the embodiment of the present disclosure may determine that the wheel input signal is not continuously input when the same wheel input signal as the wheel input signal is not input within a reference time after the input of the wheel input signal is finished.

The Remote control device according to the embodiment of the present disclosure may delete the wheel repeat control signal stored in the key buffer when the processor determines that the wheel input signal is not continuously input.

The Remote control device according to the embodiment of the present disclosure may determine that the wheel input signal is not continuously input, and delete the wheel repeat control signal stored in the key buffer when an input signal of a button different from the wheel button is input after the input of the wheel input signal is finished.

The Remote control device according to the embodiment of the present disclosure may determine that the wheel input signal is continuously input when the same wheel input signal as the wheel input signal is input within a reference time after the input of the wheel input signal is finished.

The method for operating a remote control device according to the embodiment of the present disclosure may comprising receiving a wheel input signal for a wheel button, generating a wheel input control signal corresponding to the wheel input signal, outputting the generated wheel input control signal through a wireless communication interface, determining whether the wheel input signal is continuously input, storing a wheel repeat control signal in a key buffer when the wheel input signal is continuously input, and outputting the wheel repeat control signal stored in the key buffer through the wireless communication interface at each predetermined period.

The method for operating a remote control device according to the embodiment of the present disclosure, the outputting of the generated wheel input control signal may comprise outputting the wheel input control signal as an IR signal and the outputting of the wheel repeat control signal stored in the key buffer may comprise outputting the wheel repeat control signal as an IR signal The method for operating a remote control device according to the embodiment of the present disclosure, the determining of whether the wheel input signal is continuously input may comprise, when the same wheel input signal as the wheel input signal is not input within a reference time after the input of the wheel input signal is finished, determining that the wheel input signal is not continuously input.

The method for operating a remote control device according to the embodiment of the present disclosure may comprising when it is determined that the wheel input signal is not continuously input, deleting the wheel repeat control signal stored in the key buffer.

The method for operating a remote control device according to the embodiment of the present disclosure, the determining of whether the wheel input signal is continuously input may comprise, when an input signal of a button different from the wheel button is input after the input of the wheel input signal is finished, determining that the wheel input signal is not continuously input.

The method for operating a remote control device according to the embodiment of the present disclosure, the determining of whether the wheel input signal is continuously input may comprise, when the same wheel input signal as the wheel input signal is input within a reference time after the input of the wheel input signal is finished, determining that the wheel input signal is continuously input.

Advantageous Effects

A remote control device according to an embodiment of the present disclosure has an advantage of able to solve a problem of slow channel switching because a repeat signal is not output when a user repeatedly uses a wheel button to switch a channel.

The remote control device according to an embodiment of the present disclosure has an advantage of being able to solve an uneven output generated when the wheel button is used.

The remote control device according to an embodiment of the present disclosure has an advantage of being able to solve a problem of unnecessarily changing a channel after the use of the wheel button is finished.

BEST MODE FOR CARRYING OUT THE INVENTION

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

Figure 1:
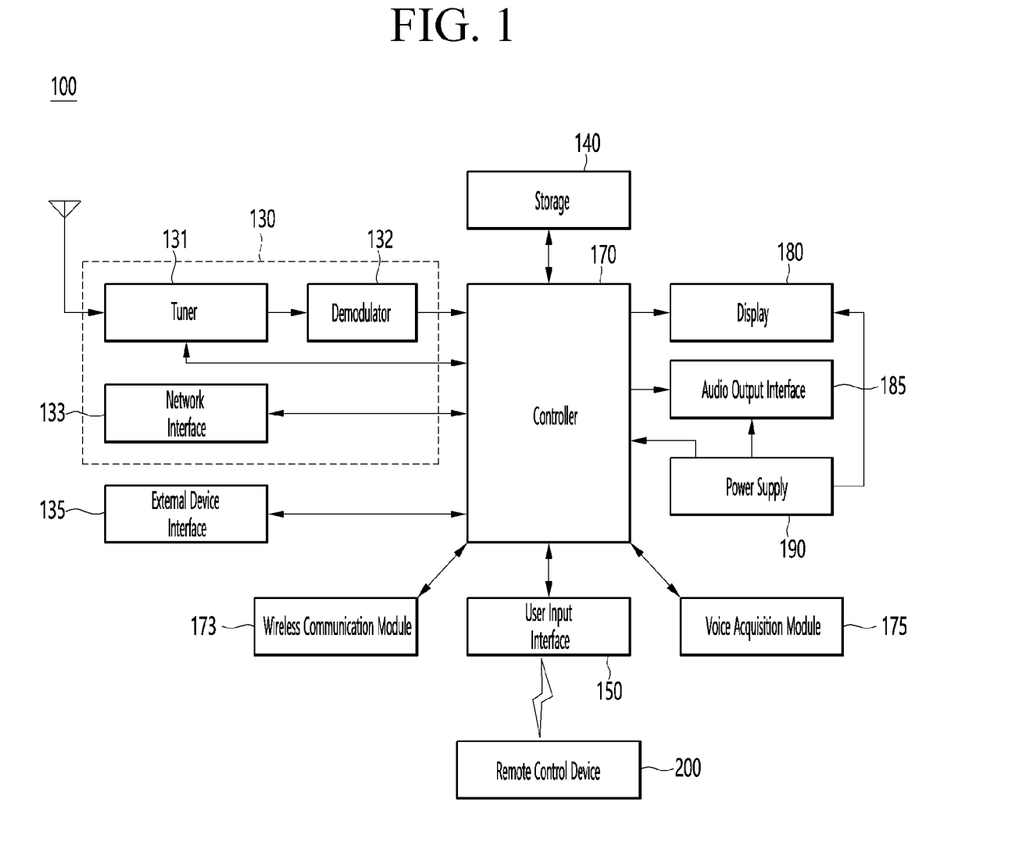
FIG. 1 is a block diagram illustrating a configuration of a display device to be controlled by a remote control device, according to an embodiment of the present disclosure.

FIG. 1 is a block diagram illustrating a configuration of a display device to be controlled by a remote control device, according to an embodiment of the present disclosure.

Referring to FIG. 1, a display device 100 may include a broadcast receiver 130, an external device interface 135, a storage 140, a user input interface 150, a controller 170, a wireless communication interface 173, a display 180, an audio output interface 185, and a power supply 190.

The broadcast receiver 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into an image signal, an audio signal, and a data signal related to a broadcast program, and restore the separated image signal, audio signal, and data signal to a format capable of being output.

The network interface 133 may provide an interface for connecting the display device 100 to a wired/wireless network including an Internet network. The network interface 133 may transmit or receive data to or from other users or other electronic devices through a connected network or another network linked to the connected network.

The network interface 133 may access a predetermined web page through the connected network or the other network linked to the connected network. That is, it is possible to access a predetermined web page through a network, and transmit or receive data to or from a corresponding server.

In addition, the network interface 133 may receive content or data provided by a content provider or a network operator. That is, the network interface 133 may receive content such as movies, advertisements, games, VOD, and broadcast signals and information related thereto provided from a content provider or a network provider through a network.

In addition, the network interface 133 may receive update information and update files of firmware provided by the network operator, and may transmit data to an Internet or content provider or a network operator.

The network interface 133 may select and receive a desired application from among applications that are open to the public through a network.

The external device interface 135 may receive an application or a list of applications in an external device adjacent thereto, and transmit the same to the controller 170 or the storage 140.

The external device interface 135 may provide a connection path between the display device 100 and an external device. The external device interface 135 may receive one or more of images and audio output from an external device connected to the display device 100 in a wired or wireless manner, and transmit the same to the controller 170. The external device interface 135 may include a plurality of external input terminals. The plurality of external input terminals may include an RGB terminal, one or more High Definition Multimedia Interface (HDMI) terminals, and a component terminal.

The image signal of the external device input through the external device interface 135 may be output through the display 180. The audio signal of the external device input through the external device interface 135 may be output through the audio output interface 185.

The external device connectable to the external device interface 135 may be any one of a set-top box, a Blu-ray player, a DVD player, a game machine, a sound bar, a smartphone, a PC, a USB memory, and a home theater, but this is only an example.

In addition, some content data stored in the display device 100 may be transmitted to a user or an electronic device, which is selected from other users or other electronic devices preregistered in the display device 100.

The storage 140 may store programs for signal processing and control of the controller 170, and may store images, audio, or data signals, which have been subjected to signal-processed.

In addition, the storage 140 may perform a function for temporarily storing images, audio, or data signals input from an external device interface 135 or the network interface 133, and store information on a predetermined image through a channel storage function.

The storage 140 may store an application or a list of applications input from the external device interface 135 or the network interface 133.

The display device 100 may play back a content file (a moving image file, a still image file, a music file, a document file, an application file, or the like) stored in the storage 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the audio output interface 185. Also, the audio signal processed by the controller 170 may be input to the external output device through the external device interface 135.

In addition, the controller 170 may control the overall operation of the display device 100.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the audio output interface 185 along with the processed image or audio signal.

In addition, the controller 170 may output an image signal or an audio signal through the display 180 or the audio output interface 185, according to a command for playing back an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface or an image which is stored in the storage 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played back, and the content may have various forms such as a broadcast image, an external input image, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi(Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100. Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The voice acquisition module 175 may acquire audio. The voice acquisition module 175 may include at least one microphone (not shown), and may acquire audio around the display device 100 through the microphone (not shown).

The display 180 may convert image signals, data signals, or on-screen display (OSD) signals, which are processed by the controller 170, or images signals or data signals, which are received by the external device interface 135, into R, G, and B signals to generate driving signals.

Meanwhile, since the display device 100 shown in FIG. 1 is only an embodiment of the present disclosure, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 may receive an image through the network interface 133 or the external device interface 135 without a tuner 131 and a demodulator 132 and play back the same.

For example, the display device 100 may be divided into an image processing device, such as a set-top box, for receiving broadcast signals or content according to various network services, and a content playback device that plays back content input from the image processing device.

In this case, an operation method of the display device according to an embodiment of the present disclosure to be described below may be implemented by not only the display device 100 as described with reference to FIG. 1 and but also one of an image processing device such as the separated set-top box and a content playback device including the display 180 and the audio output interface 185.

The audio output interface 185 receives signals voice-processed by the controller 170 and outputs the signals as voice.

The power supply 190 supplies power to the entire display device 100. In particular, the power supply 190 may supply power to the controller 170 that may be implemented in the form of a system on chip (SOC), the display 180 for image display, the audio output interface 185 for audio output, and the like.

Specifically, the power supply 190 may include a converter that converts AC power into DC power, and a DC/DC converter that converts the level of DC power.

Next, a remote control device according to an embodiment of the present disclosure will be described with reference to FIGS. 2 to 3.

Figure 2:
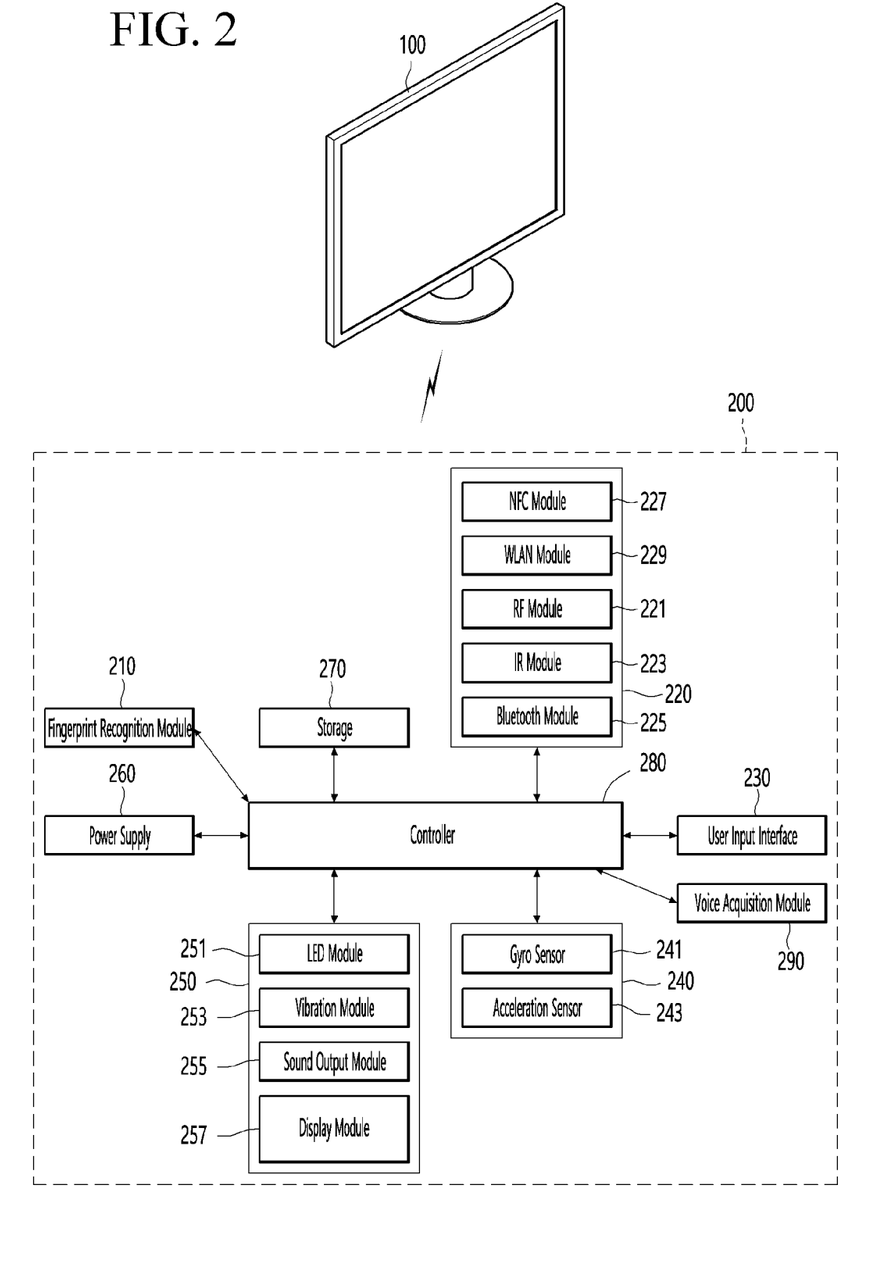
FIG. 2 is a block diagram of a remote control device according to an embodiment of the present disclosure.
Figure 3:
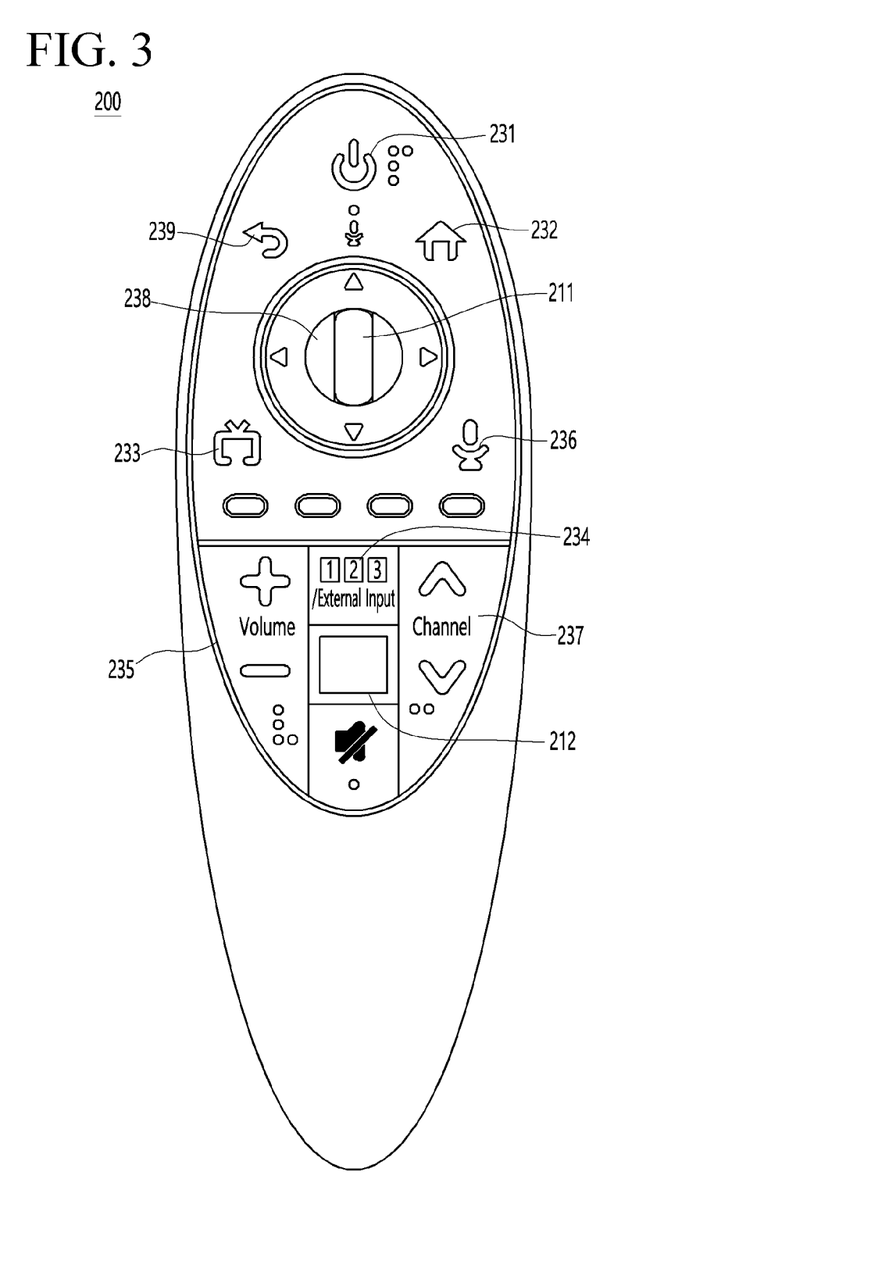
FIG. 3 shows an actual configuration example of a remote control device 200 according to an embodiment of the present disclosure.

FIG. 2 is a block diagram of a remote control device according to an embodiment of the present disclosure, and FIG. 3 shows an actual configuration example of a remote control device according to an embodiment of the present disclosure.

First, referring to FIG. 2, the remote control device 200 may include a fingerprint reader 210, a wireless communication interface 220, a user input interface 230, a sensor 240, an output interface 250, a power supply 260, a storage 270, a controller 280, and a voice acquisition module 290.

Referring to FIG. 2, the wireless communication interface 220 may transmit and receive signals to and from any one of display devices according to embodiments of the present disclosure described above.

The remote control device 200 may include an RF module 221 capable of transmitting and receiving signals to and from the display device 100 according to the RF communication standard, and an IR module 223 capable of transmitting and receiving signals to and from the display device 100 according to the IR communication standard. In addition, the remote control device 200 may include a Bluetooth module 225 capable of transmitting and receiving signals to and from the display device 100 according to the Bluetooth communication standard. In addition, the remote control device 200 may include an NFC module 227 capable of transmitting and receiving signals to and from the display device 100 according to the NFC (near field communication) communication standard, and a WLAN module 229 capable of transmitting and receiving signals to and from the display device 100 according to the wireless LAN (WLAN) communication standard.

In addition, the remote control device 200 may transmit a signal containing information on the movement of the remote control device 200 to the display device 100 through the wireless communication interface 220.

In addition, the remote control device 200 may receive a signal transmitted by the display device 100 through the RF module 221, and transmit a command regarding power on/off, channel change, volume adjustment, or the like to the display device 100 through the IR module 223 as necessary.

The user input interface 230 may include a keypad, a button, a touch pad, a touch screen, or the like. The user may input a command related to the display device 100 to the remote control device 200 by operating the user input interface 230. When the user input interface 230 includes a hard key button, the user may input a command related to the display device 100 to the remote control device 200 through a push operation of the hard key button. Details will be described with reference to FIG. 3.

Referring to FIG. 3, the remote control device 200 may include a plurality of buttons. The plurality of buttons may include a wheel button 211, a fingerprint recognition button 212, a power button 231, a home button 232, a live button 233, an external input button 234, a volume control button 235, a voice recognition button 236, a channel change button 237, an OK button 238, and a back-play button 239.

The wheel button 211 may refer to a wheel-shaped button. When the wheel-shaped wheel button 211 is rotated in an upward or downward direction, the remote control device 200 may transmit, to the display device 100, a control signal mapped to the rotation direction of the wheel button 211. For example, in a case where a channel up command signal is mapped to an operation of rotating the wheel button 211 in an upward direction, when the user rotates the wheel button 211 in an upward direction, the remote control device 200 may transmit the channel up command signal to the display device 100. As another example, in a case where a channel down command signal is mapped to an operation of rotating the wheel button 211 in a downward direction, when the user rotates the wheel button 211 in a downward direction, the remote control device 200 may transmit the channel down command signal to the display device 100.

Meanwhile, regarding the time required for the remote control device 200 to transmit a repeat signal, the rotation operation input of the wheel button 211 may take shorter time than the input of pushing the hard key button. Therefore, in the case of the wheel button 211, the remote control device 200 may have lower accuracy than other hard key buttons when transmitting the repeat signal. An embodiment of the present disclosure for solving these problems will be described below with reference to FIG. 5 and subsequent drawings.

The fingerprint recognition button 212 may be a button for recognizing a user's fingerprint. In one embodiment, the fingerprint recognition button 212 may enable a push operation, and thus may receive a push operation and a fingerprint recognition operation. The power button 231 may be a button for turning on/off the power of the display device 100. The home button 232 may be a button for moving to the home screen of the display device 100. The live button 233 may be a button for displaying a real-time broadcast program. The external input button 234 may be a button for receiving an external input connected to the display device 100. The volume control button 235 may be a button for adjusting the level of the volume output by the display device 100. The voice recognition button 236 may be a button for receiving a user's voice and recognizing the received voice. The channel change button 237 may be a button for receiving a broadcast signal of a specific broadcast channel. The OK button 238 may be a button for selecting a specific function, and the back-play button 239 may be a button for returning to a previous screen.

A description will be given referring again to FIG. 2.

When the user input interface 230 includes a touch screen, the user may input a command related to the display device 100 to the remote control device 200 by touching a soft key of the touch screen. In addition, the user input interface 230 may include various types of input means that may be operated by a user, such as a scroll key or a jog key, and the present embodiment does not limit the scope of the present disclosure.

The sensor 240 may include a gyro sensor 241 or an acceleration sensor 243, and the gyro sensor 241 may sense information regarding the movement of the remote control device 200.

For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display 180.

The output interface 250 may output an image or audio signal corresponding to the operation of the user input interface 230 or a signal transmitted from the display device 100. The user may recognize whether the user input interface 230 is operated or whether the display device 100 is controlled through the output interface 250.

For example, the output interface 450 may include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication interface 220.

In addition, the power supply 260 may supply power to the remote control device 200, and stop power supply when the remote control device 200 has not moved for a predetermined time to reduce power consumption. The power supply 260 may restart power supply when a predetermined key provided in the remote control device 200 is operated.

The storage 270 may store various types of programs and application data required for control or operation of the remote control device 200. When the remote control device 200 transmits and receives signals wirelessly through the display device 100 and the RF module 221, the remote control device 200 and the display device 100 transmit and receive signals through a predetermined frequency band.

The controller 280 of the remote control device 200 may store and refer to information on a frequency band capable of wirelessly transmitting and receiving signals to and from the display device 100 paired with the remote control device 200 in the storage 270.

The storage 270 may be referred to as a memory 270.

The controller 280 may control all matters related to the control of the remote control device 200. The controller 280 may transmit a signal corresponding to a predetermined key operation of the user input interface 230 or a signal corresponding to the movement of the remote control device 200 sensed by the sensor 240 through the wireless communication interface 220.

The controller 280 may be referred to as a processor 280.

In addition, the voice acquisition module 290 of the remote control device 200 may acquire voice.

The voice acquisition module 290 may include at least one microphone 291 and may acquire voice through the microphone 291.

Next, a description will be given referring to FIG. 4.

Figure 4:
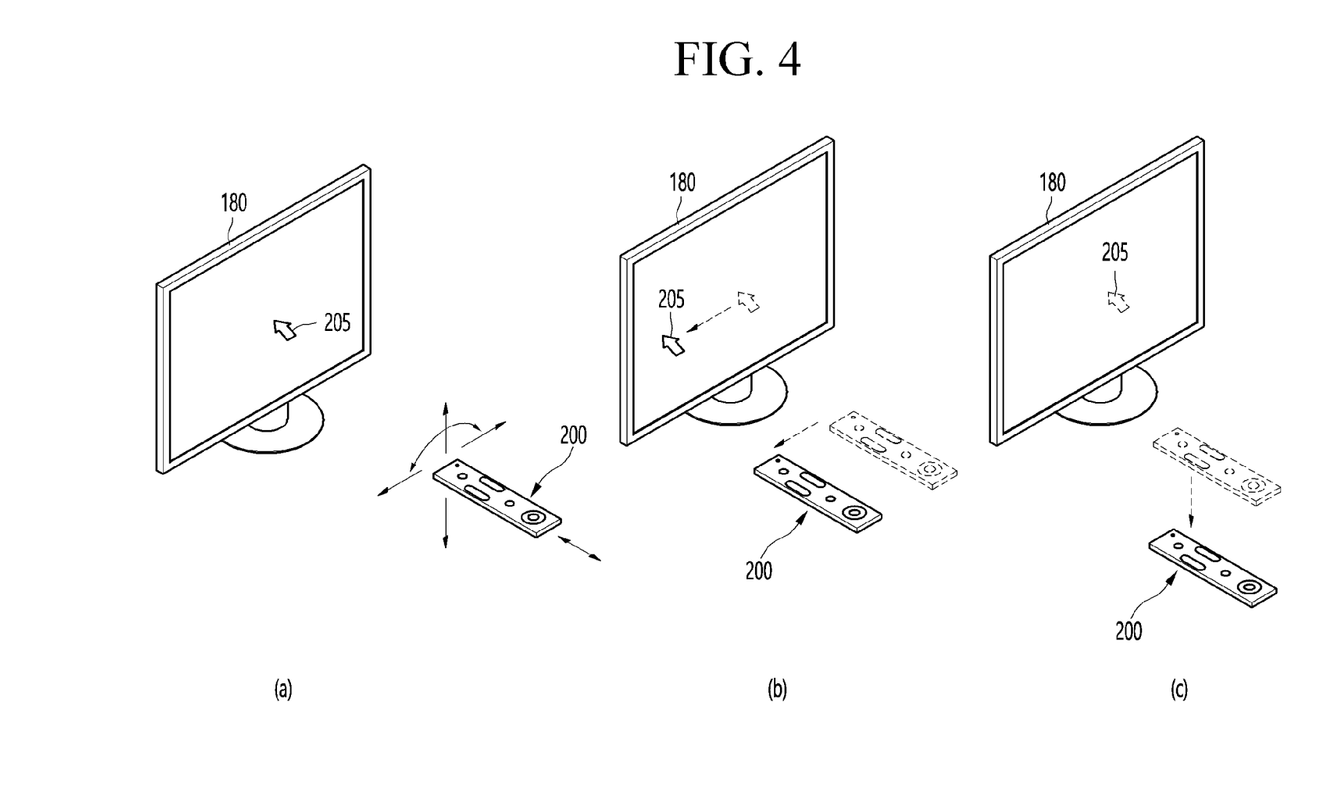
FIG. 4 shows an example of using a remote control device according to an embodiment of the present disclosure.

FIG. 4 illustrates an example of using a remote control device according to an embodiment of the present disclosure.

In FIG. 4, (a) illustrates that a pointer 205 corresponding to the remote control device 200 is displayed on the display 180.

The user may move or rotate the remote control device 200 up, down, left and right. The pointer 205 displayed on the display 180 of the display device 100 may correspond to the movement of the remote control device 200. As shown in the drawings, the pointer 205 is moved and displayed according to movement of the remote control device 200 in a 3D space, so the remote control device 200 may be called a space remote control device.

In (b) of FIG. 4, it is illustrated that that when the user moves the remote control device 200 to the left, the pointer 205 displayed on the display 180 of the display device 100 moves to the left correspondingly.

Information on the movement of the remote control device 200 detected through a sensor of the remote control device 200 is transmitted to the display device 100. The display device 100 may calculate the coordinates of the pointer 205 based on information on the movement of the remote control device 200. The display device 100 may display the pointer 205 to correspond to the calculated coordinates.

In (c) of FIG. 4, it is illustrated that a user moves the remote control device 200 away from the display 180 while pressing a specific button in the remote control device 200. Accordingly, a selected area in the display 180 corresponding to the pointer 205 may be zoomed in and displayed enlarged.

Conversely, when the user moves the remote control device 200 to be close to the display 180, the selected area in the display 180 corresponding to the pointer 205 may be zoomed out and displayed reduced.

On the other hand, when the remote control device 200 moves away from the display 180, the selected area may be zoomed out, and when the remote control device 200 moves to be close to the display 180, the selected area may be zoomed in.

Also, in a state in which a specific button in the remote control device 200 is being pressed, recognition of up, down, left, or right movements may be excluded. That is, when the remote control device 200 moves away from or close to the display 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200.

Meanwhile, in the present specification, a pointer refers to an object displayed on the display 180 in response to an operation of the remote control device 200. Accordingly, objects of various shapes other than the arrow shape shown in the drawings are possible as the pointer 205. For example, the object may be a concept including a dot, a cursor, a prompt, a thick outline, and the like. In addition, the pointer 205 may be displayed corresponding to any one point among points on a horizontal axis and a vertical axis on the display 180, and may also be displayed corresponding to a plurality of points such as a line and a surface.

In the present specification, a case where the remote control device 200 controls the display device 100 by using the IR module 223 is described as an example, but the present disclosure is not limited thereto.

Meanwhile, in controlling the display device 100 through the wheel button 211 of the remote control device 200, the nature of the structure of the wheel button 211 causes a problem in that the user's input is delivered differently from the user's input intention.

This problem will be described in detail with reference to FIGS. 5 and 6.

Figure 5:
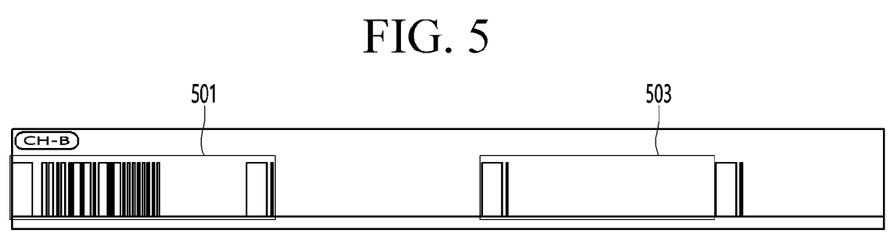
FIG. 5 is a diagram illustrating an example of the control signal output by the remote control device according to an embodiment of the present disclosure.
Figure 6:
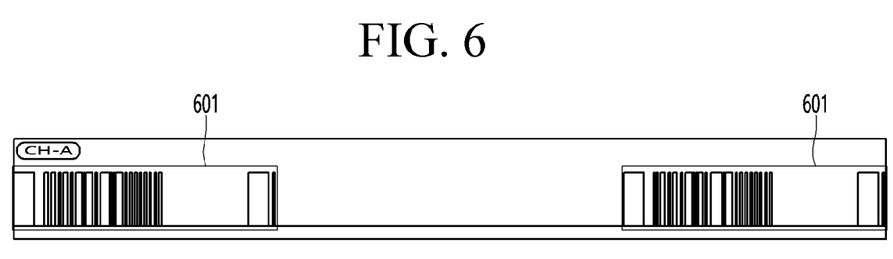
FIG. 6 is a diagrams illustrating an example of the control signal output by the remote control device according to an embodiment of the present disclosure.

FIGS. 5 and 6 are diagrams illustrating an example of the control signal output by the remote control device according to an embodiment of the present disclosure.

In general, in a case where the remote control device 200 outputs the control signal by using the IR module 223, when an input of a key inputting a first control signal is maintained, the remote control device 200 may output an IR repeat signal 503 until an output of a first IR output signal 501 is finished.

When the remote control device 200 outputs the IR repeat signal 503, the transmission speed may be fast, compared to a case where the first IR output signal 501 is continuously output twice. Therefore, in the case of the display device 100, when the channel up key is continuously pressed on the remote control device 200, the channel-up may be performed faster than when the channel up key is pressed consecutively and repeatedly.

However, in the case of the wheel button 211, due to structural characteristics, it is difficult to maintain the input of the key until the output of the first IR output signal 601 is finished. Therefore, even when the user continues to use the wheel button 211, there may be a problem in that the IR repeat signal 503 is not output as shown in FIG. 5, but the first IR output signal 601 is consecutively output twice as shown in FIG. 6.

Therefore, according to a signal output method of a conventional remote control device 200, when controlling the display device 100 through the wheel button 211, there is a problem in that a repeat signal is output unnaturally unlike other hard keys and a user feels feel that the transmission of the signal is cut off in the middle. When the repeat control signal is not output, there is a problem in that the channel change speed of the display device 100 is slow.

In order to solve the above problems, the remote control device 200 according to an embodiment of the present disclosure may include the user input interface 230 including the wheel button 211, the memory 270 including a key buffer, the wireless communication interface 220, and the processor 280 that receives a wheel input signal for the wheel button 211, generates a wheel input control signal corresponding to the wheel input signal, outputs the generated wheel input control signal through the wireless communication interface 220, stores a wheel repeat control signal in the key buffer when the wheel input signal is continuously input, and outputs the wheel repeat control signal stored in the key buffer through the wireless communication interface 220 at each predetermined period.

Figure 7:
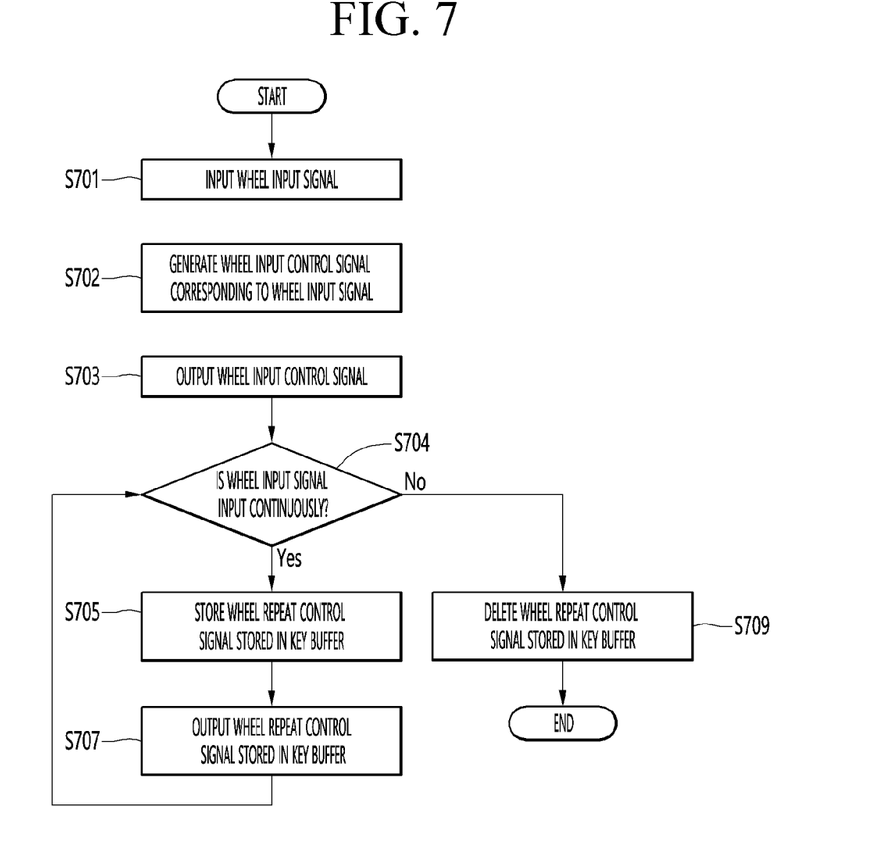
FIG. 7 is a flowchart for describing a method for operating a remote control device according to an embodiment of the present disclosure.

FIG. 7 is a flowchart for describing a method for operating a remote control device according to an embodiment of the present disclosure.

Referring to FIG. 7, the processor 280 of the remote control device 200 according to an embodiment of the present disclosure may receive a wheel input signal (S701).

The wheel input signal may refer to an input signal generated when a user manipulates the wheel button 211. For example, when the user initiates the input of rotating the wheel button 211 in an upward direction, the wheel input signal may be an input signal indicating the upward rotation of the wheel. In contrast, when the user initiates the input of rotating the wheel button 211 in a downward direction, the wheel input signal may be an input signal indicating the downward rotation of the wheel.

The processor 280 of the remote control device 200 may generate a wheel input control signal corresponding to the wheel input signal (S702).

The wheel input control signal corresponding to the wheel input signal may refer to a control signal mapped for controlling the display device 100 based on the rotation direction of the wheel button 211. For example, the wheel input signal for rotating the wheel button 211 in the upward direction may be mapped to a channel up control signal of the display device 100, and the wheel input signal for rotating the wheel button 211 in the downward direction may be mapped to a channel down control signal of the display device 100.

The processor 280 of the remote control device 200 may output the generated wheel input control signal (S703).

The processor 280 may output the wheel input control signal through the wireless communication interface 220. For example, in a case where the channel up control signal is mapped to the input of rotating the wheel button 211 in the upward direction, when the user rotates the wheel button 211 in the upward direction, the remote control device 200 may transmit the channel up control signal to the display device 100. As another example, in a case where the channel down control signal is mapped to the input of rotating the wheel button 211 in the downward direction, when the user rotates the wheel button 211 in the downward direction, the remote control device 200 may transmit the channel down control signal to the display device 100.

Accordingly, when the display device 100 receives the wheel input control signal, the display device 100 may perform a control operation mapped to the control signal.

The processor 280 may determine whether the wheel input signal is continuously input (S704). Determining whether the wheel input signal is continuously input may refer to a case where after the wheel input signal is input, the same wheel input signal as the wheel input signal is input again within a reference time.

The reference time may refer to an average time required for the wheel button 211 to operate once. The reference time may be 50 ms, but this is only an example.

When the same wheel input signal is input again within the reference time after the input of the wheel input signal is finished, the processor 280 may determine that the wheel input signal is continuously input. In contrast, when the same wheel input signal is not input within the reference time after the input of the wheel input signal is finished, the processor 280 may determine that the wheel input signal is not continuously input.

When the processor 280 determines that the wheel input signal is continuously input, the processor 280 may store the wheel repeat control signal in the key buffer (S705). The wheel repeat control signal may refer to a repeat signal for repeating the control operation of the first wheel input control signal. For example, when the first wheel input control signal is a channel up control signal, the wheel repeat control signal may be a control signal for repeating the channel up operation, and when the first wheel input control signal is a channel down control signal, the wheel repeat control signal may be a control signal for repeating the channel down operation.

The key buffer may refer to a partial area of the memory 270 that temporarily stores the control signals to be output by the remote control device 200. The processor 280 may temporarily store the control signals in the key buffer and output the control signals through the wireless communication interface 220 according to the input order. The memory 270 of the remote control device 200 may include a key buffer.

The processor 280 may output the wheel repeat control signal stored in the key buffer (S707). The processor 280 may control the wireless communication interface 220 to transmit, to the display device 100, the wheel repeat control signal stored in the key buffer.

The processor 280 may transmit the wheel repeat control signal stored in the key buffer at each predetermined period. In this case, the predetermined period may generally refer to a time difference between the IR repeat signals when outputting the IR repeat signals. This allows the user to feel a natural control operation.

Operation S705 in which the processor 280 stores the wheel repeat control signal in the key buffer and operation S707 in which the processor 280 outputs the wheel repeat control signal stored in the key buffer may be performed simultaneously. That is, while storing the wheel repeat control signal in the key buffer, the processor 280 may output the wheel repeat control signal stored in the key buffer.

The processor 280 may receive the wheel input signal and generates and outputs the wheel input control signal corresponding to the wheel input signal, and may repeat operations S705 and S707 until the process 280 determines that the wheel input signal is not continuously input.

When the processor 280 determines that the wheel input signal is not continuously input (S704), the processor 280 may delete the wheel repeat control signal stored in the key buffer (S709).

A case where the wheel input signal is not continuously input may include a case where the user stops the wheel input, a case where the user rotates the wheel in an upward direction and then rotates the wheel in a downward direction, a case where the user rotates the wheel in the downward direction and then rotates the wheel in an upward direction, and a case where an input signal from a button other than the wheel button is input.

The number of wheel repeat control signals stored in the key buffer by the operation of the wheel button 211 may be greater than the number of signals to be actually output. In particular, in a case where the user stops the operation of the wheel button 211 or inputs another key, when the wheel repeat control signal stored in the key buffer is transmitted to the display device 100, unnecessary control such as the change of the channel of the display device 100 may occur even if the user does not manipulate the wheel button 211.

Therefore, when the remote control device 200 according to an embodiment of the present disclosure determines that the wheel input signal is not continuously input, the remote control device 200 may delete the wheel repeat control signal stored in the key buffer, thereby obtaining an advantage of solving a problem in that the channel is unnecessarily switched after the user's use of the wheel button is finished.

The operation of the remote control device 200 will be described in detail with reference to FIG. 8.

Figure 8:
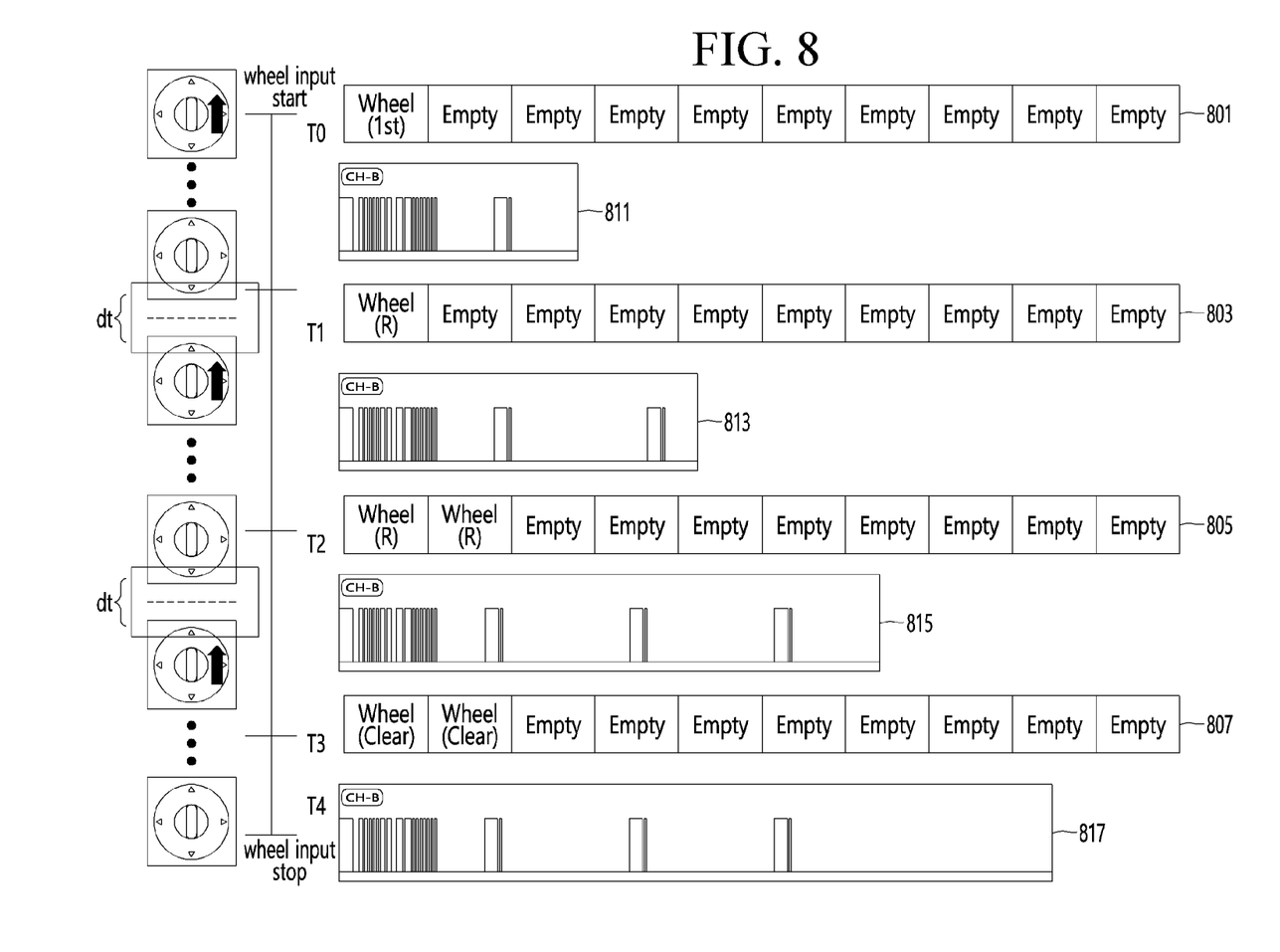
FIG. 8 is a flowchart for describing a method for operating a remote control device according to an embodiment of the present disclosure.

FIG. 8 is a flowchart for describing a method for operating a remote control device according to an embodiment of the present disclosure.

FIG. 8 shows an example of an input of the wheel button 211 and IR accumulation signals 811, 813, 815, and 817 output from key buffers 801, 803, 805, and 807 and the wireless communication interface 220.

When the wheel input signal for initially operating the wheel button 211 is input, the processor 280 stores the wheel input control signal corresponding to the wheel input signal in the key buffer 801 (TO).

The processor 280 may output the wheel input control signal stored in the key buffer 801. In this case, the IR accumulation signal 811 output from the wireless communication interface 220 may represent a waveform of outputting the wheel input control signal corresponding to the wheel input signal.

When the same wheel input signal as the wheel input signal is input within a reference time dt after the input of the wheel input signal is finished, the processor 280 may store the wheel repeat control signal in the key buffer 803 (T1).

The processor 280 may output the wheel repeat control signal stored in the key buffer 803 through the wireless communication interface 220. The wireless communication interface 220 may output the IR repeat signal 813.

The processor 280 may store the wheel repeat control signal in the key buffer 805 until it is determined that the wheel input signal is not continuously input, and may output the wheel repeat control signal stored in the key buffer 805 at each predetermined period. In this case, the IR accumulation signal 815 output from the wireless communication interface 220 may represent a waveform of outputting the IR repeat signal and the wheel input control signal corresponding to the wheel input signal.

The processor 280 may delete the wheel repeat control signal stored in the key buffer 807 when the wheel input signal is not input within the reference time, and may not output the control signals any more when input signals of other keys are not input, like the IR accumulation signal 817 output from the wireless communication interface 220 (T3, T4).

According to the above-described embodiment, the remote control device 200 of the present disclosure has an advantage of being able to constantly output the repeat signal like other hard key buttons while continuously manipulating the wheel button 211. Therefore, the remote control device 200 of the present disclosure is capable of natural control and fast channel switching even in control through the wheel button 211.

Figure 9:
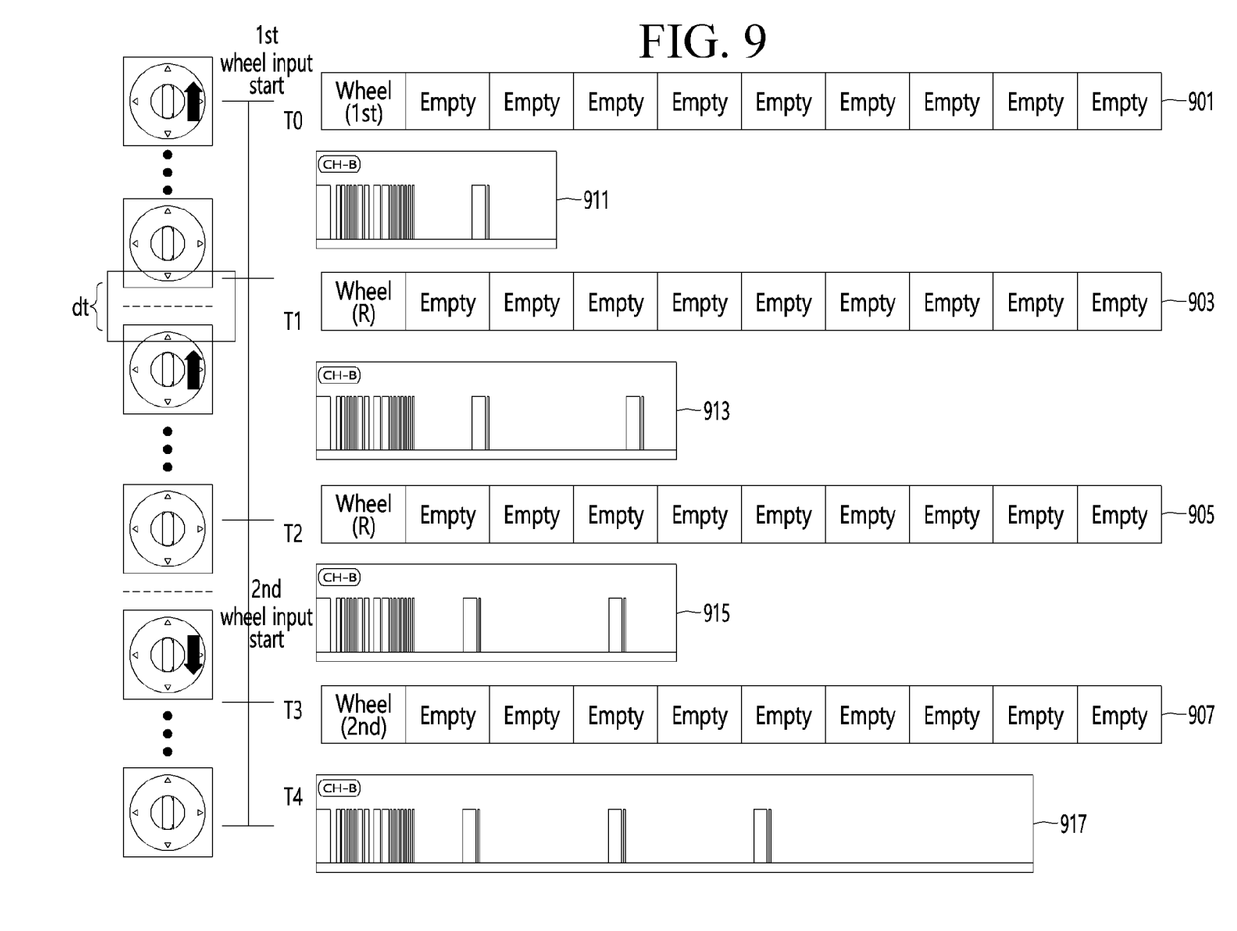
FIG. 9 is a flowchart for describing a method for operating a remote control device according to another embodiment of the present disclosure.

FIG. 9 is a flowchart for describing a method for operating a remote control device according to another embodiment of the present disclosure.

FIG. 9 shows an example of an input of the wheel button 211 and IR accumulation signals 911, 913, 915, and 917 output from key buffers 901, 903, 905, and 907 and the wireless communication interface 220 according to time flow from top to bottom.

When the wheel input signal for initially operating the wheel button 211 is input, the processor 280 stores the wheel input control signal corresponding to the wheel input signal in the key buffer 901 (TO).

The processor 280 may output the wheel input control signal stored in the key buffer 901. In this case, the IR accumulation signal 911 output from the wireless communication interface 220 may represent a waveform of outputting the wheel input control signal corresponding to the wheel input signal.

When the same wheel input signal as the wheel input signal is input within a reference time dt after the input of the wheel input signal is finished, the processor 280 may store the wheel repeat control signal in the key buffer 903 (T1).

The processor 280 may output the wheel repeat control signal stored in the key buffer 903 through the wireless communication interface 220. The wireless communication interface 220 may output the IR repeat signal 913.

When an input signal of a button different from the previous input of the wheel button is input after the input of the wheel input signal is finished, the processor 280 may determine that the wheel input signal is not continuously input and may delete the wheel repeat control signal stored in the key buffer 905 (T2).

In addition, when the first wheel input signal is an input signal for rotating the wheel button 211 in an upward direction and the wheel input signal for rotating the wheel button 211 in a downward direction is received (T3), the processor 280 may store a wheel input control signal corresponding to a new wheel input signal in the key buffer 907 and output the wheel input control signal.

At this time, the IR accumulation signal 917 output from the wireless communication interface 220 may represent a waveform of the wheel input control signal corresponding to the wheel input signal, the wheel repeat control signal, and the new wheel input control signal.

Figure 10:
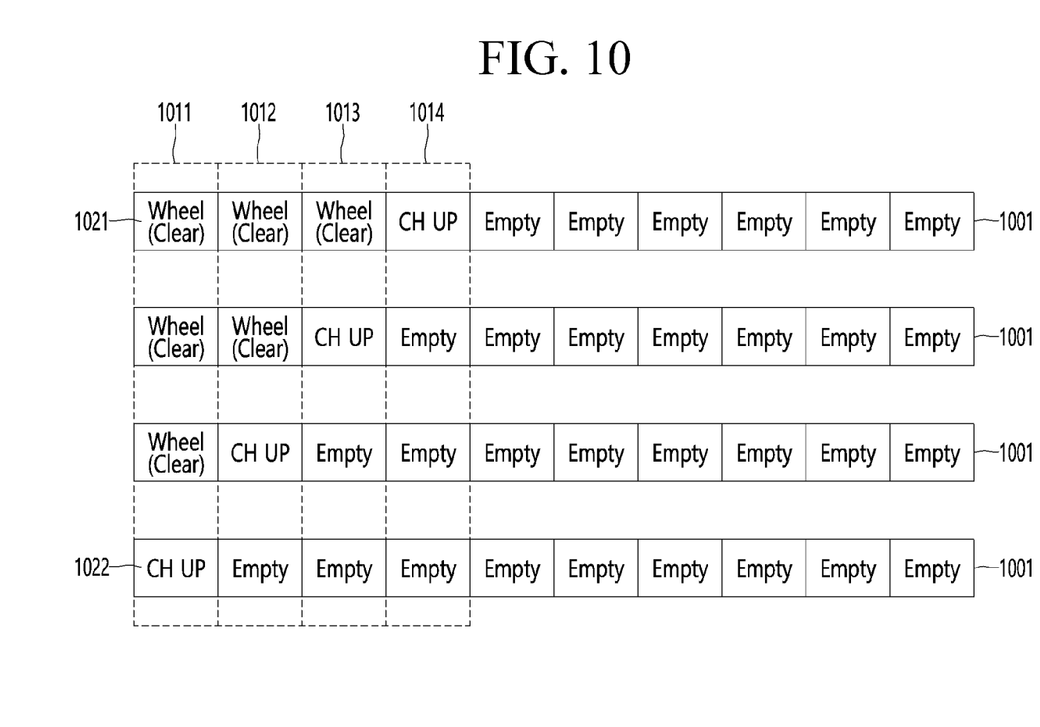
FIG. 10 is an exemplary diagram for describing a method by which a remote control device of the present disclosure deletes a wheel repeat control signal stored in a key buffer.

FIG. 10 is an exemplary diagram for describing a method by which a remote control device of the present disclosure deletes a wheel repeat control signal stored in a key buffer.

FIG. 10 shows an example of control signals stored in a key buffer 1101 according to time flow from top to bottom.

In a situation where a first stack 1011, a second stack 1012, a third stack 1013, and a wheel repeat control signal 1021 of the key buffer 1001 are stored, when an input signal of a hard key different from the wheel button 211, like a channel up key, is received, the processor 280 may store a channel up key control signal 1022 in the fourth stack 1014, counts the number of wheel repeat control signals 1021 remaining in the key buffer 1001, and increases the deletion speed of the wheel repeat control signal 1021.

As a result, as shown in FIG. 10, the remote control device 200 may remove the wheel repeat control signal 1021 stored in the key buffer 1001 and output only the channel up key control signal 1022. The channel up key control signal is only an example.

The present disclosure described above may be embodied as computer-readable code on a medium on which a program is recorded. A computer-readable medium includes any types of recording devices in which data readable by a computer system is stored. Examples of the computer-readable medium include hard disk drive (HDD), solid state disk (SSD), silicon disk drive (SDD), ROM, RAM, CD-ROM, magnetic tape, floppy disk, optical data storage device, and the like. In addition, the computer may include the controller 180 of the display device 100. Accordingly, the above detailed description should not be construed as restrictive in all aspects and should be considered as illustrative. The scope of the present specification should be determined by reasonable interpretation of the appended claims, and all modifications within the equivalent scope of the present specification fall within the scope of the present specification.

The above description is merely illustrative of the technical spirit of the present disclosure, and various modifications and changes can be made by those of ordinary skill in the art, without departing from the scope of the present disclosure.

Therefore, the embodiments disclosed in the present disclosure are not intended to limit the technical spirit of the present disclosure, but are intended to explain the technical spirit of the present disclosure. The scope of the technical spirit of the present disclosure is not limited by these embodiments.

The respective embodiments disclosed in the present specification may be practiced alone or in combination with other embodiments.

The scope of the present disclosure should be interpreted by the appended claims, and all technical ideas within the scope equivalent thereto should be construed as falling within the scope of the present disclosure.

The invention claimed is:

1. A remote control device comprising:
   a user input interface comprising a wheel button;
   a memory comprising a key buffer;
   a wireless communication interface; and
   a processor configured to receive a wheel input signal for the wheel button, generate a wheel input control signal corresponding to the wheel input signal, output the generated wheel input control signal through the wireless communication interface, store a wheel repeat control signal in the key buffer when the wheel input signal is continuously input, and output the wheel repeat control signal stored in the key buffer through the wireless communication interface at each predetermined period,
   wherein, when a same wheel input signal as the wheel input signal is not input within a reference time after the input of the wheel input signal is finished, the processor is further configured to determine that the wheel input signal is not continuously input, and
   wherein, when the processor determines that the wheel input signal is not continuously input, the processor is further configured to delete the wheel repeat control signal stored in the key buffer.

2. The remote control device of claim 1, wherein the wireless communication interface comprises an infrared (IR) module and is configured to output at least one of the wheel input control signal or the wheel repeat control signal as an IR signal through the IR module.

3. The remote control device of claim 1, wherein, when an input signal of a button different from the wheel button is input after the input of the wheel input signal is finished, the processor is further configured to determine that the wheel input signal is not continuously input, and delete the wheel repeat control signal stored in the key buffer.

4. The remote control device of claim 1, wherein, when the same wheel input signal as the wheel input signal is input within the reference time after the input of the wheel input signal is finished, the processor is further configured to determine that the wheel input signal is continuously input.

5. A method for operating a remote control device, the method comprising:
   receiving a wheel input signal for a wheel button;
   generating a wheel input control signal corresponding to the wheel input signal;
   outputting the generated wheel input control signal through a wireless communication interface;
   determining whether the wheel input signal is continuously input;
   storing a wheel repeat control signal in a key buffer when the wheel input signal is continuously input; and
   outputting the wheel repeat control signal stored in the key buffer through the wireless communication interface at each predetermined period, wherein determining whether the wheel input signal is continuously input comprises:
when a same wheel input signal as the wheel input signal is not input within a reference time after the input of the wheel input signal is finished, determining that the wheel input signal is not continuously input, and
wherein the method further comprises:
when it is determined that the wheel input signal is not continuously input, deleting the wheel repeat control signal stored in the key buffer.

6. The method of claim 5, wherein outputting the generated wheel input control signal comprises outputting the wheel input control signal as a first infrared (IR) signal, and
wherein outputting the wheel repeat control signal stored in the key buffer comprises outputting the wheel repeat control signal as a second IR signal.

7. The method of claim 5, wherein determining whether the wheel input signal is continuously input comprises, when an input signal of a button different from the wheel button is input after the input of the wheel input signal is finished, determining that the wheel input signal is not continuously input.

8. The method of claim 5, wherein determining whether the wheel input signal is continuously input comprises, when the same wheel input signal as the wheel input signal is input within the reference time after the input of the wheel input signal is finished, determining that the wheel input signal is continuously input.

9. A non-transitory recording medium having recorded thereon machine-executable instructions for operating a remote control device, the method instructions comprising:
receiving a wheel input signal for a wheel button;
generating a wheel input control signal corresponding to the wheel input signal;
outputting the generated wheel input control signal through a wireless communication interface;
determining whether the wheel input signal is continuously input;
storing a wheel repeat control signal in a key buffer when the wheel input signal is continuously input; and
outputting the wheel repeat control signal stored in the key buffer through the wireless communication interface at each predetermined period,
wherein determining whether the wheel input signal is continuously input comprises:
when a same wheel input signal as the wheel input signal is not input within a reference time after the input of the wheel input signal is finished, determining that the wheel input signal is not continuously input, and
wherein the instructions further comprise:
when it is determined that the wheel input signal is not continuously input, deleting the wheel repeat control signal stored in the key buffer.

\* \* \* \* \*